United States Patent
Yamada

(10) Patent No.: US 8,214,547 B2
(45) Date of Patent: Jul. 3, 2012

(54) IMAGE PROCESSING DEVICE HAVING A PLURALITY OF CONTROL UNITS

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 106 days.

(21) Appl. No.: 12/788,027

(22) Filed: May 26, 2010

(65) Prior Publication Data

US 2011/0078339 A1    Mar. 31, 2011

(30) Foreign Application Priority Data

Sep. 30, 2009  (JP) ................................. 2009-227666

(51) Int. Cl.
*G06F 3/00* (2006.01)

(52) U.S. Cl. ............ 710/14; 710/62; 713/300; 713/320; 713/323; 713/324

(58) Field of Classification Search ........................ None
See application file for complete search history.

(56) References Cited

U.S. PATENT DOCUMENTS

| | | | | |
|---|---|---|---|---|
| 6,260,111 | B1 * | 7/2001 | Craig et al. | 711/115 |
| 6,711,447 | B1 | 3/2004 | Saeed | 700/82 |
| 7,330,987 | B2 * | 2/2008 | Morisawa | 713/321 |
| 8,032,769 | B2 * | 10/2011 | Noda et al. | 713/320 |
| 2004/0268162 | A1 * | 12/2004 | Morisawa | 713/300 |
| 2005/0066206 | A1 * | 3/2005 | Beers et al. | 713/320 |
| 2005/0239518 | A1 * | 10/2005 | D'Agostino et al. | 455/574 |
| 2006/0064297 | A1 * | 3/2006 | Sugishita et al. | 703/24 |
| 2006/0075150 | A1 * | 4/2006 | Hwang et al. | 710/14 |
| 2006/0206734 | A1 * | 9/2006 | Hori | 713/300 |
| 2006/0259803 | A1 * | 11/2006 | Edwards et al. | 713/320 |
| 2007/0079363 | A1 * | 4/2007 | Itoh | 726/5 |
| 2008/0018914 | A1 * | 1/2008 | Doi et al. | 358/1.1 |
| 2008/0180718 | A1 * | 7/2008 | Yamashita | 358/1.15 |
| 2009/0235098 | A1 * | 9/2009 | Matsunaga | 713/320 |
| 2009/0296142 | A1 * | 12/2009 | Tomihisa | 358/1.15 |
| 2010/0141990 | A1 * | 6/2010 | Yamada | 358/1.15 |

FOREIGN PATENT DOCUMENTS

| | | | |
|---|---|---|---|
| JP | H08-101609 | A | 4/1996 |
| JP | 2001-010125 | A | 1/2001 |
| JP | 2007-105917 | A | 4/2007 |
| JP | 2007336402 | A * | 12/2007 |
| JP | 2009-043247 | A | 2/2009 |

OTHER PUBLICATIONS

Japan Patent Office, Office Action for Japanese Patent Application No. 2009-227666 (counterpart to above-captioned patent application), mailed Aug. 4, 2011.

* cited by examiner

*Primary Examiner* — Steven Snyder

(74) *Attorney, Agent, or Firm* — Baker Botts L.L.P.

(57) ABSTRACT

An image processing device includes a memory unit that stores plural sets of user information and a plurality of modes in correspondence with each other so as to specify correspondence between a plurality of users and the plurality of modes, and a plurality of control units that execute a function on image data in one of the plurality of modes corresponding to one of the plurality of users having a predetermined relationship with a current user.

19 Claims, 9 Drawing Sheets

MODE TABLE

| REGISTRATION MODE / REGISTERED USER | FUNCTION SPECIFY | EXECUTABLE-FUNCTION SPECIFY | EXPECTED-USE-FREQUENCY SPECIFY | AUTOMATIC REGISTRATION | MANUAL REGISTRATION | REGISTERED PERFORMANCE MODE |
|---|---|---|---|---|---|---|
| USER 1 | ALL FUNCTIONS | — | — | OFF | — | HIGH PERFORMANCE MODE |
| USER 2 | — | SCANNER FACSIMILE COMMUNICATION | — | OFF | — | LOW PERFORMANCE MODE |
| USER 3 | — | — | 10 TIMES/DAY | OFF | — | MEDIUM PERFORMANCE MODE |
| USER 4 | — | — | — | ON | — | MEDIUM PERFORMANCE MODE |
| USER 5 | — | — | — | — | LOW PERFORMANCE MODE | LOW PERFORMANCE MODE |

FIG.2

DEVICE TABLE

| DEVICE | OPERATING FREQUENCY (MHz) |
|---|---|
| PRINTING UNIT | 100 |
| IMAGE PROCESSING UNIT | 20 |
| SCANNER UNIT | 12 |
| FACSIMILE UNIT | 10 |
| OPERATION UNIT | 2 |
| NETWORK I/F | 1 |

FIG.3

FUNCTION TABLE

| FUNCTION | REQUIRED DEVICE |
|---|---|
| PC PRINT | PRINTING UNIT · IMAGE PROCESSING UNIT · NETWORK I/F |
| COPY | OPERATION UNIT · SCANNER UNIT · PRINTING UNIT · IMAGE PROCESSING UNIT |
| FACSIMILE PRINT | OPERATION UNIT · PRINTING UNIT |
| SCANNER | OPERATION UNIT · SCANNER UNIT |
| FACSIMILE COMMUNICATION | OPERATION UNIT · FACSIMILE UNIT |

FIG.4

SPECIFIED MODE TABLE

| SPECIFIED FUNCTION | PERFORMANCE MODE |
|---|---|
| ALL FUNCTIONS | HIGH PERFORMANCE MODE |
| PC PRINT<br>COPY<br>FACSIMILE PRINT | MEDIUM PERFORMACE MODE |
| SCANNER<br>FACSIMILE COMMUNICATION | LOW PERFORMACNE MODE |

FIG.5

MODE TABLE

| Registration Mode / Registered User | Function Specify | Executable-Function Specify | Expected-Use-Frequency Specify | Automatic Registration | Manual Registration | Registered Performance Mode |
|---|---|---|---|---|---|---|
| USER 1 | ALL FUNCTIONS | — | — | OFF | — | HIGH PERFORMANCE MODE |
| USER 2 | — | SCANNER FACSIMILE COMMUNICATION | — | OFF | — | LOW PERFORMANCE MODE |
| USER 3 | — | — | 10 TIMES/DAY | OFF | — | MEDIUM PERFORMANCE MODE |
| USER 4 | — | — | — | ON | — | MEDIUM PERFORMANCE MODE |
| USER 5 | — | — | — | — | LOW PERFORMANCE MODE | LOW PERFORMANCE MODE |

FIG.6

HISTORY TABLE

| REGISTERED USER \ DAY | 5 DAYS AGO | 4 DAYS AGO | 3 DAYS AGO | 2 DAYS AGO | 1 DAY AGO | MOST FREQUENTLY USED MODE |
|---|---|---|---|---|---|---|
| USER 1 | MEDIUM PERFORMANCE MODE | MEDIUM PERFORMANCE MODE | HIGH PERFORMANCE MODE | MEDIUM PERFORMANCE MODE | MEDIUM PERFORMANCE MODE | MEDIUM PERFORMANCE MODE |
| USER 2 | LOW PERFORMANCE MODE | LOW PERFORMANCE MODE | LOW PERFORMANCE MODE | LOW PERFORMANCE MODE | LOW PERFORMANCE MODE | LOW PERFORMANCE MODE |
| USER 3 | HIGH PERFORMANCE MODE | MEDIUM PERFORMANCE MODE | HIGH PERFORMANCE MODE | HIGH PERFORMANCE MODE | MEDIUM PERFORMANCE MODE | HIGH PERFORMANCE MODE |
| USER 4 | HIGH PERFORMANCE MODE | MEDIUM PERFORMANCE MODE | MEDIUM PERFORMANCE MODE | LOW PERFORMANCE MODE | LOW PERFORMANCE MODE | MEDIUM PERFORMANCE MODE |
| USER 5 | HIGH PERFORMANCE MODE | HIGH PERFORMANCE MODE | HIGH PERFORMANCE MODE | HIGH PERFORMANCE MODE | HIGH PERFORMANCE MODE | HIGH PERFORMANCE MODE |

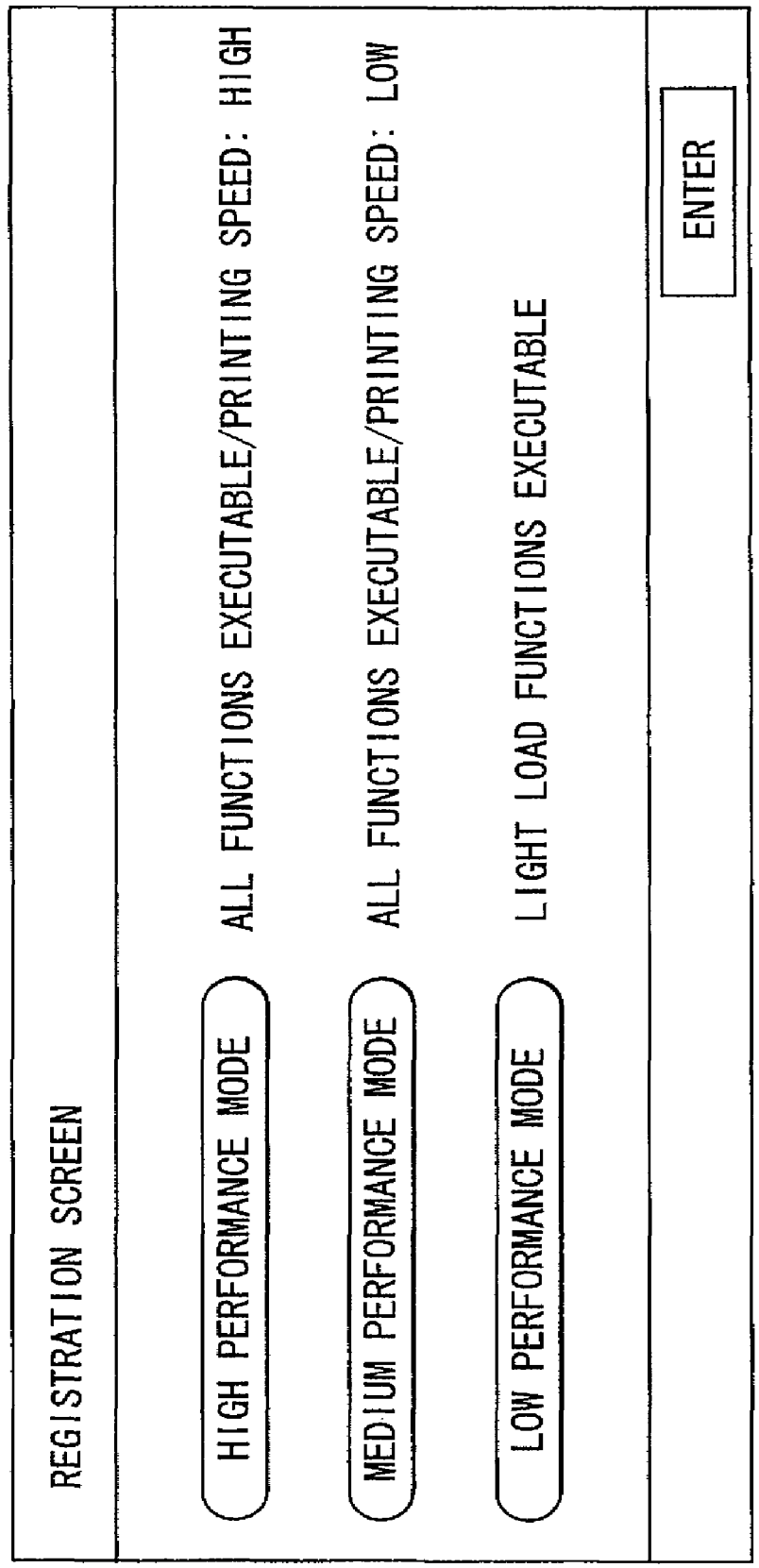

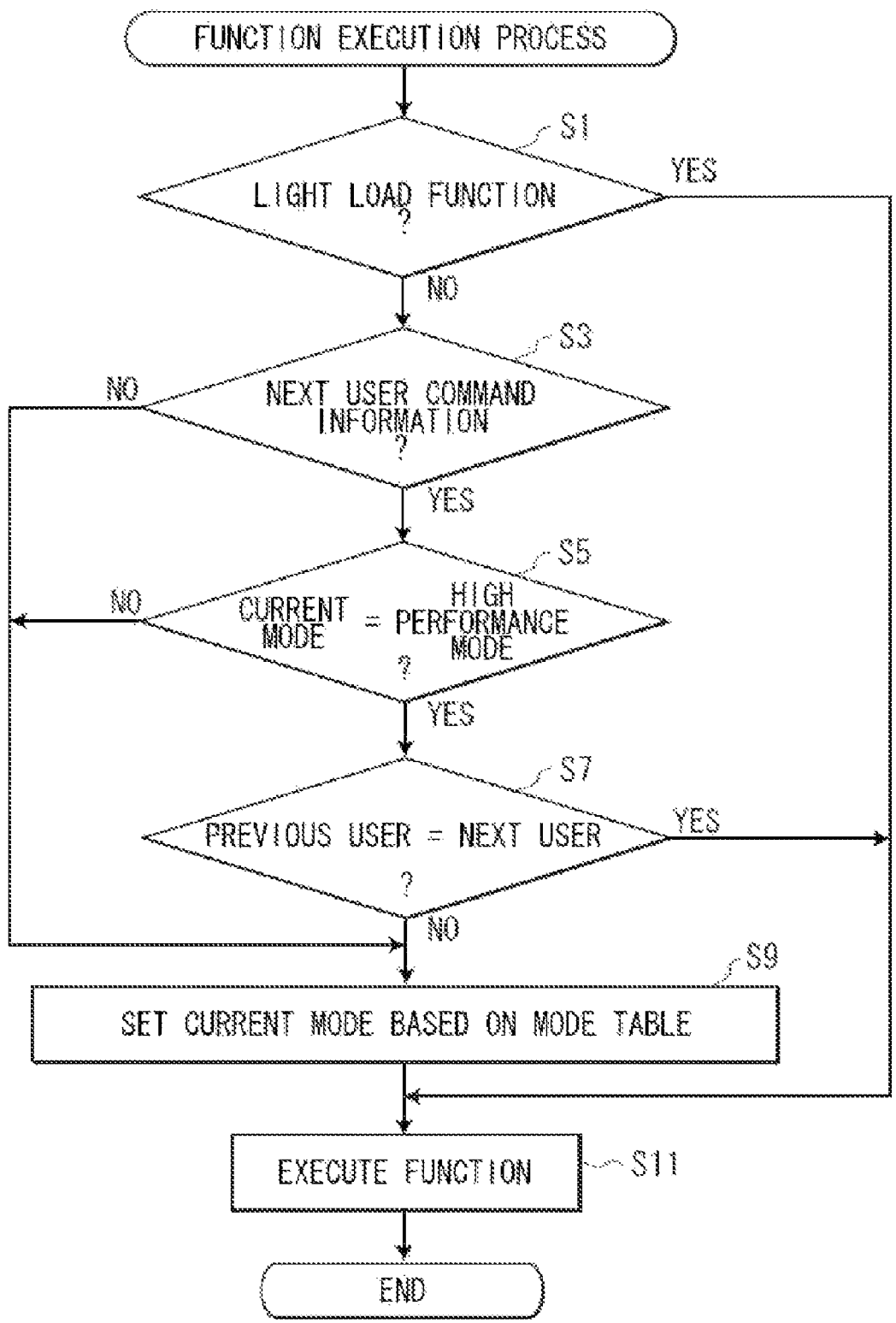

< PREVIOUS USER MATCHES NEXT USER >

< PREVIOUS USER DIFFERS FROM NEXT USER >

IMAGE PROCESSING DEVICE HAVING A PLURALITY OF CONTROL UNITS

CROSS REFERENCE TO RELATED APPLICATION

This application claims priority from Japanese Patent Application No. 2009-227666 filed Sep. 30, 2009. The entire content of this priority application is incorporated herein by reference.

TECHNICAL FIELD

The present invention relates to an image processing device, a storage medium storing a control program for controlling the image processing device, and an image processing system.

BACKGROUND

Japanese Patent-Application Publication No. H8-101609 has proposed an image processing device including a main control unit and a sub-control unit. The main control unit controls each of various units, such as a printer unit, and the sub-control unit controls an interface for communicating with external devices. During a power-saving mode, the main control unit is placed in a halt state, and only the sub-control unit is in a running state. This configuration reduces power consumption in the power-saving mode.

SUMMARY

However, the image processing device described above enters one of a plurality of modes without taking users who operate the image processing device into consideration, so the image processing device is not satisfactorily convenient.

In view of the foregoing, it is an object of the invention to provide an image processing device with a plurality of control units, an image processing program, and an image processing system, each capable of enhancing convenience of the image processing device.

In order to attain the above and other objects, the invention provides an image processing device including an operating unit, a plurality of control units, a first acquiring unit, and a memory unit. The plurality of control units control the operating unit to execute a first function on image data, and each includes a processing unit. The first acquiring unit acquires user-command information indicating a current user. The plurality of control units execute the first function in one of a plurality of modes of different performance levels. The memory unit stores plural sets of user information and the plurality of modes in correspondence with each other so as to specify correspondence between a plurality of users and the plurality of modes. The control units execute the first function in one of the plurality of modes corresponding to one of the plurality of users having a predetermined relationship with the current user.

There is also provided an image processing device including an operating unit, a control unit, a first acquiring unit, and a memory unit. The control twit controls the operating unit to execute a function on image data in one of a plurality of modes including a first mode and a second mode. The control unit includes a first central processing unit and a second central processing unit. Both the first and second central processing units are in a running state when the control unit is in the first mode, and only the first central processing unit is in the running state when the control unit is in the second mode. The first acquiring unit acquires user information indicating a user. The memory unit stores plural sets of user information and the plurality of modes in correspondence with each other so as to specify correspondence between a plurality of users and the plurality of modes. When the first acquiring unit acquires the user information, the control unit controls the operating unit to execute the function in one of the plurality of modes stored in the memory unit in correspondence with the user information acquired by the first information.

There is also provided a storage medium storing a set of program instructions executable on an image processing device including an operating unit, a plurality of control units that control the operating unit to execute a function on image data and that include respective processing units, an acquiring unit, and a memory unit, and usable for controlling at least one of the plurality of control units. The instructions includes controlling the at least one of the plurality of control units to control the acquiring unit to acquire user-command information indicating a current user, controlling the at least one of the plurality of control units to read registered information from the memory unit, the registered information indicating correspondence between a plurality of users and a plurality of modes of different performance levels, and controlling the at least one of the plurality of control units to determine one of the plurality of modes corresponding to one of the plurality of users having a predetermined relationship with the current user based on the registered information and to control the operating unit to execute the function in the predetermined one of the plurality of modes.

There is also provided an image processing system including an image processing device that executes a function on image data and an information processing device communicable with the image processing device. The image processing device includes an operating unit, a plurality of control units, and an acquiring unit. The plurality of control units control the operating unit to execute the function, and each includes a processing unit. The acquiring unit acquires user-command information indicating a current user. The information processing device includes a memory unit. The plurality of control units execute the function in one of a plurality of modes of different performance levels. The memory unit stores plural sets of user information and the plurality of modes in correspondence with each other so as to specify correspondence between a plurality of users and the plurality of modes. The control units execute the function in one of the plurality of modes corresponding to one of the plurality of users having a predetermined relationship with the current user.

BRIEF DESCRIPTION OF THE DRAWINGS

The particular features and advantages of the invention as well as other objects will become apparent from the following description taken in connection with the accompanying drawings, in which:

FIG. 2 is a view showing a device table according to the first embodiment of the invention;

FIG. 3 is a view showing a function table according to the first embodiment of the invention;

FIG. 4 is a view showing a specified mode table according to the first embodiment of the invention;

FIG. 5 is a view showing a mode table according to the first embodiment of the invention;

FIG. 6 is a view showing a history table according to the first embodiment of the invention;

FIG. 7 is a view showing an example of a registration screen according to the first embodiment of the invention;

FIG. 8 is a flowchart representing a function execution process according to the first embodiment of the invention;

DETAILED DESCRIPTION

Figure 1:
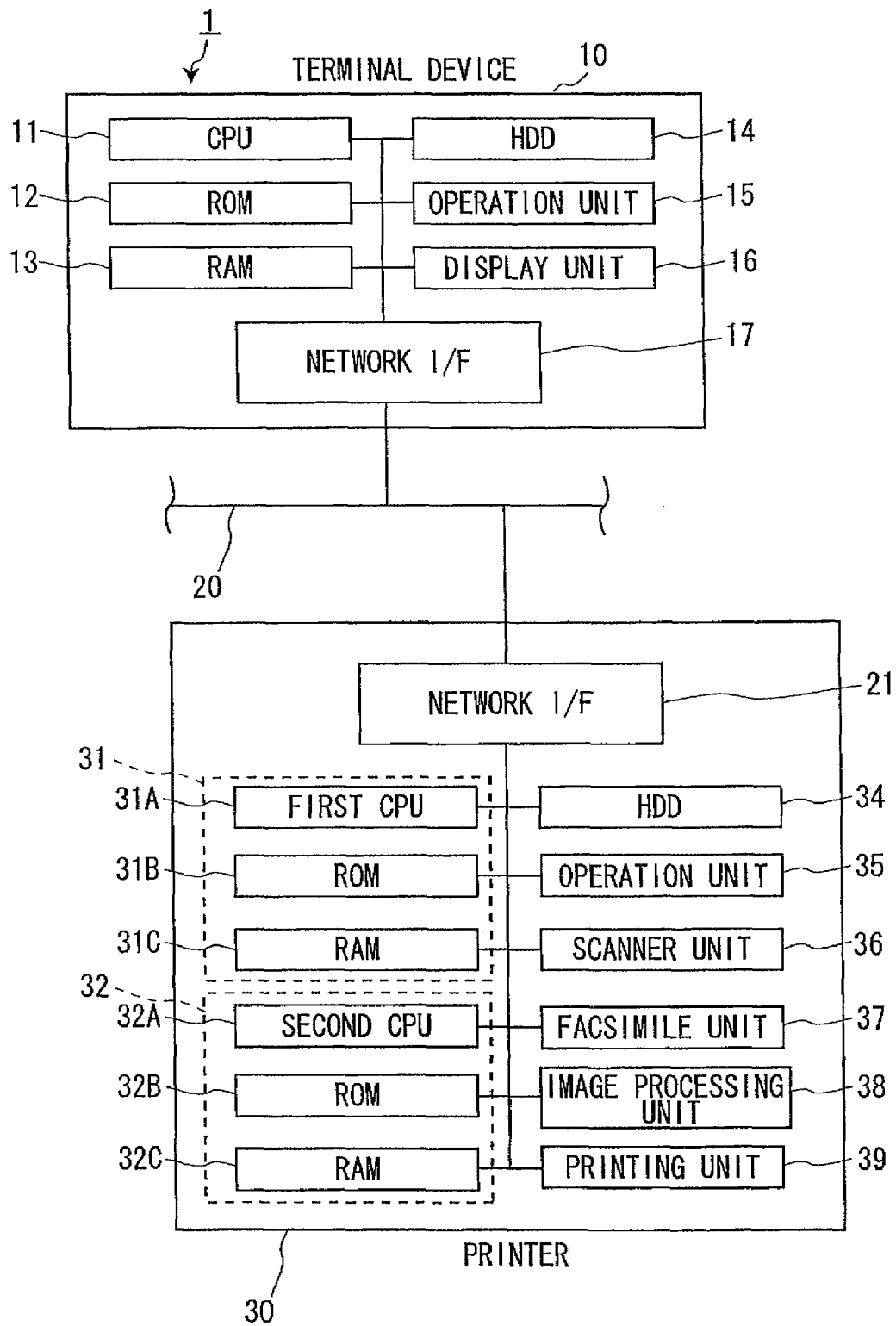
FIG. 1 is a block diagram showing electrical configuration of an image processing system according to a first embodiment of the invention.

Image processing systems according to embodiments of the invention will be described while referring to the accompanying drawings wherein like parts and components are designated by the same reference numerals to avoid duplicating description.

First Embodiment

First, an image processing system 1 according to a first embodiment will be described with reference to FIGS. 1 to 9(B).

1. Electrical Configuration

As shown in FIG. 1, the image processing system 1 includes a terminal device 10 (information processing device) and a printer 30 (image processing device). The terminal device 10 may be a personal computer, for example.

(1) Terminal Device

The terminal device 10 includes a CPU 11, a ROM 12, a RAM 13, a hard disk drive (HDD) 14, an operation unit 15, a display unit 16, and a network interface (I/F) 17. Although not shown in the drawings, the operation unit 15 includes a keyboard and a pointing device, and the display unit 16 includes a liquid crystal display panel. The network I/F 17 is connected to a communication circuit 20. The HDD 14 stores various programs including an operation system (OS), an application software for generating image data to be printed, and a printer driver for controlling the printer 30. The CPU 11 performs overall control of the terminal device 10 based on a program read from the ROM 12 while storing processed results in the RAM 13.

(2) Printer

The printer 30 is a multifunction device capable of executing a plurality of functions including a PC print function, a copy function, a scanner function, a facsimile communication function, and a facsimile print function. The printer 30 includes a first control unit 31, a second control unit 32, and a HDD 34. The first control unit 31 includes a first CPU 31A, a ROM 31B, and a RAM 31C. The second control unit 32 includes a second CPU 32A, a ROM 32B, and a RAM 32C.

Each of the ROM 31B and the ROM 32B stores various programs for controlling the printer 30. Each of the first CPU 31A and the second CPU 32A performs overall control of the printer 30 based on a program read from the respective ROM 31B, 32B while storing processed results into the respective RAM 31C, 32C.

The first control unit 31 has a higher performance level than the second control unit 32, and consumes more power than the second control unit 32. More specifically, the operating frequency of the first CPU 31A is 400 MHz, for example, and the operating frequency of the second CPU 32A is 50 MHz, for example. Also, the RAM 31C has a larger memory capacity than the RAM 32C. Accordingly, the first control unit 31 is capable of processing larger image data at a higher speed compared to the second control unit 32.

The printer 30 further includes various devices (operating units) including a network I/F 21, an operation unit 35, a scanner unit 36, a facsimile unit 37, an image processing unit 38, and a printing unit 39.

The network I/F 21 is connected to such external device as the terminal device 10 through the communication circuit 20, enabling data communication therebetween. Although not shown in the drawings, the operation unit 35 includes various buttons through which a user inputs various commands including an execution command for each function. The operation unit 35 also includes a display unit (liquid crystal display panel, for example) and a lamp, and is capable of displaying various setting screens and operation status.

The scanner unit 36 generates scanned data by scanning an original (not shown). The facsimile unit 37 transmits facsimile data to or receives facsimile data from a remote facsimile device (not shown). The image processing unit 38 image-processes various image data. For example, the image processing unit 38 converts the image data into printable data. The image data may be scanned data generated by the scanner unit 36, print data received at the network I/F 21, or the like.

The printing unit 39 forms an image on a recording sheet (paper sheet, OHP sheet, or the like) based on the image data in an electrophotographic method or an inkjet method, for example.

2. Correspondence Between Devices and Functions

FIG. 2 shows a device table, which is stored in the HDD 34, for example. The device table shows operating frequencies (clock numbers) required to operate each of the devices (the printing unit 39, the image processing unit 38, the scanner unit 36, the facsimile unit 37, the operation unit 35, and the network I/F 21).

As will be understood from FIG. 2, the first control unit 31 is capable of operating the all devices at high speed by itself. The second control unit 32 is not capable of operating the printing unit 39 by itself, but is capable of operation the other devices by itself.

FIG. 3 shows a function table, which is stored in the HDD 34, for example. The function table identifies devices required for each function. Specifically, in the PC print function, the network I/F 21 receives print data from the terminal device 10, and the image processing unit 38 image-processes the print data (expands the print data into bitmap data, for example), and the printing unit 39 forms a print-object image on a recording medium. Thus, the network I/F 21, the image processing unit 38, and the printing unit 39 are required for the PC print function.

In the copy function, the operation unit 35 accepts a copy request from a user, and the scanner unit 36 generates scanned data by scanning an original, and the image processing unit 38 image-processes the scanned data, and the printing unit 39 prints a scanned image on a recording medium. Thus, the operation unit 35, the scanner unit 36, the image processing unit 38, and the printing unit 39 are required for the copy function.

In the scanner function, the operation unit 35 accepts a scan request from a user, and the scanner unit 36 generates scanned data of an original. Thus, the operation unit 35 and the scanner unit 36 are required for the scanner function. In the facsimile communication function, the operation unit 35 accepts a facsimile communication request from a user, and the facsimile unit 37 exchanges facsimile data between a remote facsimile device. Thus, the operation unit 35 and the facsimile unit 37 are required for the facsimile communication function. In the facsimile print function, the operation unit 35 accepts a facsimile print request from a user, and the printing unit 39 forms an image on a recording medium based on previously-received facsimile data. Thus, the operation unit 35 and the printing unit 39 are required for the facsimile print function.

Loads in executing the PC print function, the copy function, and the facsimile print function are relatively heavy because these functions require the printing unit 39 of a relatively high operating frequency to operate, and these functions will be referred to as "heavy load functions" in the following description. On the other hand, loads in executing the scanner function and the facsimile communication function are relatively light because these functions require only devices of relatively low operating frequencies, and these functions will be referred to as "light load functions" in the following description.

3. Performance Modes

The printer 30 has three performance modes of different performance levels. These performance modes include a high performance mode, a medium performance mode, and a low performance mode.

In the high performance mode, the first and second control units 31 and 32 are both in a running state. In medium performance mode, only the first control unit 31 is in the running state, and the second control unit 32 is in a sleep state (power-saving state). In the low performance mode, only the second control unit 32 is in the running state, and the first control unit 31 is in the sleep state.

Note that the first and second control units 31 and 32 can operate the devices in the running state, but cannot access the HDD 34 or the like in the sleep state. The first and second control units 31 and 32 in the sleep state can only detect predetermined signals (activation interrupt signal, for example) from the control unit in the running state or from external devices.

4. Registration of Performance Modes

FIG. 4 shows a specified mode table, which is stored in the HDD 34, for example. The specified mode table shows correspondence between the functions and the performance modes. Details will be described later.

The printer 30 also has a plurality of registration modes, which include a function-specify mode, an executable-function specify mode, an expected-use-frequency specify mode, an automatic registration mode, and a manual registration mode.

FIG. 5 shows a mode table, which is stored in the HDD 34, for example. In the example of FIG. 5, five users 1 to 5 (user information for the users 1 to 5) are registered on the mode table These users 1 to 5 will be referred to as "registered users". One of the performance modes is allocated to and registered for each registered user on the mode table in one of the registration modes in the following manner.

That is, a manager or a user inputs identification information (such as a user ID or a password) through either the operation unit 35 or the terminal device 10. Then, any one of the control units 31 and 32 in the running state (hereinafter referred to as "running control unit") or the CPU 11 executes a user authentication process to determine whether or not the identification information matches registered user identification information previously registered in the HDD 14 or 34. If the authentication succeeds, the manager or the user is enabled to select one of the registration modes.

(1) Function-Specify Mode

The function-specify mode is for enabling the manager or a registered user to specify one or more of the functions that the registered user mainly uses, and one of the performance modes corresponding to the specified function(s) is registered on the mode table. The registered user or the manager may even specify the all functions.

More specifically, the manager or the registered user selects the function-specify mode through the operation unit 35 or 15, inputs user identification information of the registered user, and then specifies one or more functions. Then, the operation unit 35 or the internet I/F 21 acquires specified-function information that indicates correspondence between the registered user and the specified function(s). The running control unit selects one of the performance modes for the registered user (allocates one of the performance modes to the registered user) based on both the specified-function information and the specified mode table shown in FIG. 4, and registers the specified function and the selected performance mode on the mode table shown in FIG. 5. Note that the specified mode table shown in FIG. 4 has been prepared such that a performance mode of higher performance level is selected for functions of higher operating frequencies.

For example, because the all functions are specified for the user 1 in the function-specify mode, the high performance mode is selected and registered for the user 1 based on the specified mode table shown in FIG. 4. However, if only the heavy load functions are selected for a registered user, then the medium performance mode is selected for the registered user. If only the light load functions are selected for a registered user, then the low performance modes is selected for the user. Thus, a specified function can be executed in a performance mode of performance level suited for load in executing the specified function. Note that a function specified for a registered user will be referred to as "specified function" hereinafter.

(2) Executable-Function Specify Mode

The executable-function specify mode is for enabling the manager to specify one or more of the functions that the manger authorizes a registered user to execute, and one of the performance modes corresponding to the specified function (s) is selected based on the specified mode table shown in FIG. 4 and registered on the mode table shown in FIG. 5. The manager can even specify the all functions, but the registered user cannot execute unspecified functions.

A method to register the specified function and a selected performance mode in the executable-function specify mode is substantially the same as that for the function-specify mode.

In the example shown in FIG. 5, the scanner function and the facsimile function, which are both the light load functions, are selected for the user 2, so the low performance mode is registered for the user 2 based on the specified mode table shown in FIG. 4.

(3) Expected-Use-Frequency Specify Mode

The expected-use-frequency specify mode is for enabling either the manager or a registered user to specify an estimated number of times that the registered user will execute a predetermined function within a predetermined time period (a single day, for example), and one of the performance modes is selected according to the estimated number and registered on the mode table.

Specifically, the manager or the registered user selects the expected-use-frequency specify mode through the operation unit 35 or 15, and inputs user identification information of the registered user and the estimated number. Then, either the operation unit 35 or the internet I/F 21 acquires use-frequency information that indicates the correspondence between the registered user and the estimated number. The running control unit selects one of the performance modes for the registered user based on the use-frequency information and registers the selected performance mode on the mode table.

In this embodiment, a performance mode of higher performance level is selected when the estimated number is larger. For example, the high performance mode is selected if the estimated number is 20 or more. The medium performance mode is selected if the estimated number is between 10 to 19. The low performance mode is selected if the estimated number is less than 10. In the example shown in FIG. 5, an estimated number "10" is input for the user 3 in the expected-use-frequency specify mode, so the medium performance mode is registered in correspondence with the user 3. Thus, the functions can be executed in one of the performance modes determined based on the estimated number input for the registered user.

(4) Automatic Registration Mode

The automatic registration mode is for automatically selecting one of the performance modes for a registered user based on history information stored on a history table shown in FIG. 6, which is stored on the HDD 34, for example, without requiring the manager nor the registered user to specify a function or the like.

The history table stores the most frequently used performance mode for each registered user. Specifically, each time any registered user executes a function, the running control unit determines which one of the performance modes was used for executing the function (mode in which the function was executed), and counts the number of times each performance mode is used for each registered user. The running control unit determines one of the performance modes which was used the most in each day for each registered user, and stores the determination results on the history table. That is, the history table shows one of the performance modes that was used the most for each registered user each day, and keeps this information for the latest five days, for example. The history table also indicates a most frequently used mode, which is one of the performance modes that was used the most in the last five days, for example, for each user. The history table is updated once each day.

The automatic registration mode is selected when the manager or a registered user selects the automatic registration mode through the operation unit 35 or 15 and inputs user identification number of the registered user and an ON command. When the automatic registration mode is selected in this manner, then either the operation unit 35 or the internet I/F 21 acquires ON information that indicates the correspondence between the registered user and the ON command. The running control unit selects one of the performance modes for the registered user based on the ON information and contents of the history table. In this embodiment, the running control unit selects the most frequently used mode registered on the history table in correspondence with the registered user. Then, the running control unit registers the selected performance mode on the mode table.

In the example of FIG. 5, the ON command is input for the user 4 in the automatic registration mode, so the medium performance mode is selected and registered for the user 4.

Thus, a function can be executed for a registered user in one of the performance modes that is predicted to be suitable for the registered user from the history information stored on the history table.

The running control unit also changes the performance mode registered on the mode table in the automatic registration mode as needed each time the running control unit updates the history information stored on the history table. For example, if the most frequently used mode for the user 4 is changed from the medium performance mode to the low performance mode, then the running control unit replaces the medium performance mode registered for the registered user 4 on the mode table with the low performance mode. Thus, a function can be executed in one of the performance modes selected based on the latest history information that is updated in a preferable manner.

(5) Manual Registration Mode

The manual registration mode is for allowing a registered user to manually select and register one of the performance modes. Specifically, when the registered user selects the manual registration mode through manipulating the operation unit 35 or 15, then the miming control unit controls either the display unit 16 or a display unit of the operation unit 35 to display a registration screen shown in FIG. 7.

The registration screen shows three selections corresponding to the respective performance modes and evaluation information regarding performance of each performance mode.

In this embodiment, the evaluation information indicates functions executable in each performance mode and an average print speed of the printing unit 39 operated in each performance mode (number of sheets that the printing unit 39 can print per unit of time). The operating frequency also may be indicated.

Thus, the registered user references the evaluation information and selects one of the performance modes through manipulating the operation unit 35 or 15. As a result, either the operation unit 35 or the hamlet I/F 21 acquires selection information that indicates the correspondence between the registered user and the selected performance mode. Then, the running control unit registers the selected performance mode on the mode table for the registered user based on the selection information.

In the example of FIG. 5, the low performance mode is selected and registered for the user 5 in the manual registration mode. Thus, the registered user 5 can execute any function in the performance mode (the low performance mode, in this example) that the user 5 has selected.

Because the registered user is informed of the evaluation information for each performance mode when making a selection, the registered user can select a suitable performance mode. Note that the internet I/F 21 also functions as a fourth acquiring unit and a notification unit in a case where the registration screen is displayed on the display unit 16. The evaluation information may be notified to the registered user in different ways. For example, the evaluation information may be notified by voice.

5. Function Execution Process

If a user (current user) wishes to execute one of the functions (current function), then the current user inputs user identification information through the operation unit 35 or 15. Then, either the running control unit or the CPU 11 performs a predetermined user authentication process. If the authentication succeeds, then the current user is prompted to input an execution command for the current function. When the current user inputs the execution command, then either the operation unit 35 or the internet I/F 21 acquires user command information that indicates the correspondence between the current user and the execution command, and the running control unit performs a function execution process.

The function execution process will be described with reference to the flowchart shown in FIG. 8. The running control unit performs the function execution process upon detecting the user command information (current user command information). Note that if the running control unit detects another user command information (next user command information) while performing the function execution process for the current user, then the running control unit stores the next user command information into the HDD 34.

In the function execution process, first in S1, the running control unit determines whether or not the current function is one of the light load functions. If not (S1: No), then in S3 the running control unit determines whether or not a next user command information is currently stored in the HDD 34. If not (S3: No), then in S9 the running control unit sets a current mode. More specifically, the running control unit references the mode table (FIG. 5) and determines one of the registered users that matches the current user. Then, the running control unit sets the current mode to one of the performance modes allocated to the registered user that the current user matches.

That is, if the current mode differs from a performance mode allocated to the current user, then the current mode is changed to the performance mode. For example, if the current mode is the medium performance mode in which only the first control unit 31 is in the running state, and if the performance mode allocated to the current user is the high performance mode, then the first control unit 31 outputs the activation interrupt signal to the second control unit 32 in the sleep state. As a result, the second control unit 32 enters the running state, and thus the performance mode is switched to the high performance mode.

If the current mode is the low performance mode in which only the second control unit 32 is in the running state, and if the performance mode allocated to the current user is the medium performance mode, then the second control unit 32 outputs the activation interrupt signal to the first control unit 31 and enters the sleep state. As a result, the first control unit 31 enters the running state, and the performance mode is switched to the medium performance mode.

After setting the current mode in S9, the running control unit executes the current function in the current mode in S11. Then, the running control unit ends the function execution process.

If the next user command information is currently stored in the HDD 34 (S3: Yes), then in S5 the running control unit determines whether or not the current mode is the high performance mode. If not (S5: No), then the running control unit proceeds to S9. On the other hand, if so (S5: Yes), then in S7 the running control unit determines whether or not a previous user is the same as a next user. If so (S7: Yes), then the running control unit proceeds to S11. On the other hand, if not (S7: No), then the running control unit proceeds to S9.

Figure 9A:
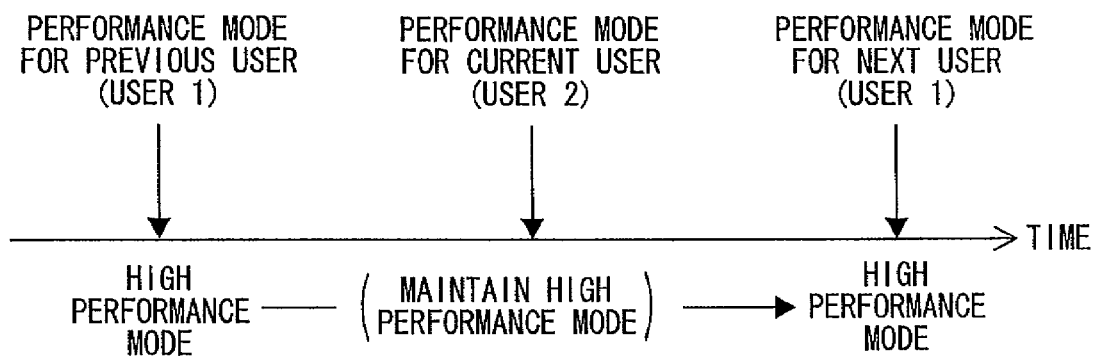
FIG. 9(A) is an explanatory view showing a case where a previous user matches a next user.

FIG. 9(A) shows a case where the current user is the user 2 and the previous user and the next user are both the user 1 to which the high performance mode is allocated. In this case, a positive determination is made in S7 of FIG. 8, and the high performance mode is maintained as the current mode. That is, the current function is executed in the high performance mode, although the low performance mode is allocated to the current user (user 2). If the performance mode is switched to the low performance mode for the current user in the example of FIG. 9(A), then the loads on the first and second control units 31 and 32 increase. Maintaining the same performance mode suppresses the loads on the first and second control units 31 and 32. Because the performance mode is maintained only if the performance mode corresponding to a next user and the performance corresponding to a previous user are both the high performance mode, the current function can be executed regardless of the magnitude of load in executing the current function.

Figure 9B:
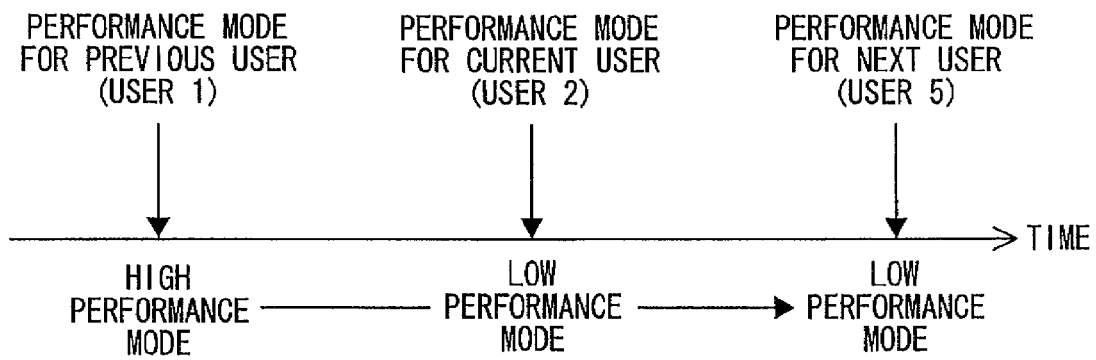
FIG. 9(B) is an explanatory view showing a case where a previous user differs from a next user.

FIG. 9(B) shows a different case where a previous user differs from a next user. In this case, the performance mode allocated to the next user is not always the high performance mode. Thus, the current function is executed in one of the performance modes allocated to the current user, i.e., one of the performance modes determined based on the mode table.

If a positive determination is made in S1 (S1: Yes), then the running control unit executes the current function in the current mode, and ends the function execution process.

Here, switching the performance mode based on the mode table each time any function is to be executed increases the loads on the first and control units 31 and 32. However, according to the present embodiment, if the current function is one of the light load functions, then the performance mode is maintained the same. That is, the current function is executed in one of the performance modes in which the previous function has been executed. Thus, the loads on the first and second control units 31 and 32 can be suppressed. Also, because the performance mode is maintained only if the current function is the light load function, the current function can be executed regardless of the performance level of the performance mode.

6. Effects

As described above, according to the present embodiment, the performance mode is determined for each user. This enhances the convenience compared to a case where the performance mode is determined regardless of the user.

Second Embodiment

Next, a second embodiment of the invention will be described next. The second embodiment is the same as the first embodiment, but differs in performing a function execution process shown in FIG. 10. Because the processes in S1, S3, S9 and S11 of FIG. 10 are identical to those of FIG. 8, description thereof will be omitted.

Figure 10:
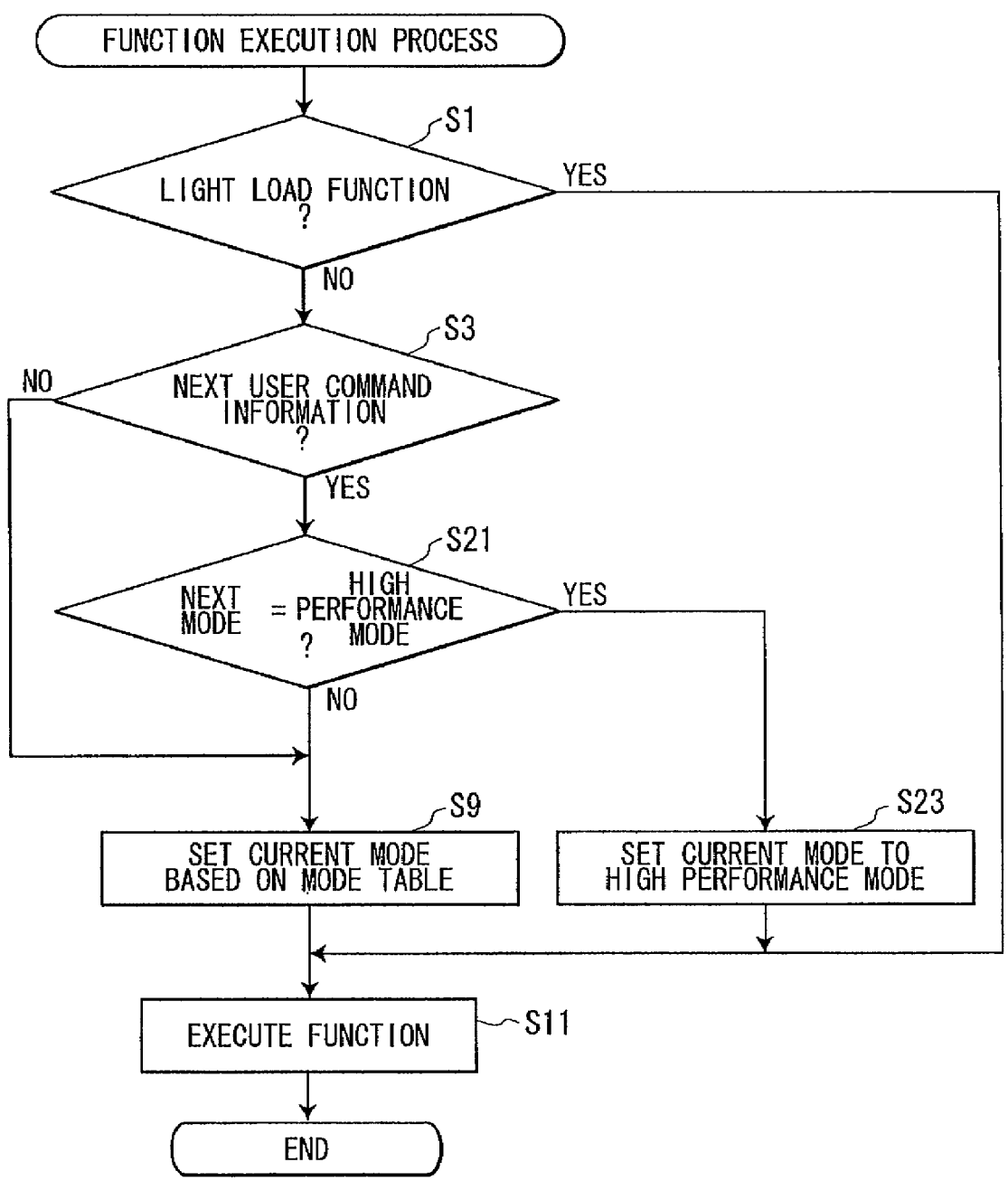
FIG. 10 is a flowchart representing a function execution process according to a second embodiment of the invention.

In the function execution process of FIG. 10, if it is determined in S3 that a next user command information is stored in the HDD 34 (S3: Yes), then in S21 the running control unit determines whether or not the next performance mode (performance mode allocated to the next user) is the high performance mode based on the mode table. If not (S21: No), then the running control unit proceeds to S9.

On the other hand, if so (821: Yes), then in S23 the running control unit sets the current mode to the high performance mode. That is, if the high performance mode is allocated to the next user, then it is assumed that the next user wishes the next function (function that the next user wishes to execute) as soon as possible. According to the function execution process of the present embodiment, it is possible to promptly execute the next function by executing the current function in the high performance mode. Thus, it is possible to meet such user demand.

<Modifications>

While the invention has been described in detail with reference to the embodiments thereof, it would be apparent to those skilled in the art that various changes and modifications may be made therein without departing from the spirit of the invention.

For example, the image processing device of the invention is not limited to the printer 30 described above, but may be a printer without the scanner function or the facsimile function, a facsimile device, an image reading device, or the like. That is, the image processing device may be any device as long as the device can execute a function on image data.

In the above-described embodiments, the copy function, the scanner function, the facsimile communication function and the like are described as functions of the image processing device. However, this is not limitation of the invention. The image processing device may have different functions as long as the function is to be executed on image data. Such functions include an image storing function for storing image data into the HDD 34, a specific image extracting function for extracting a specific image from scanner data, a mailing function, and a PC facsimile function for receiving image data from the terminal device 10 and for transmitting facsimile data generated based on the image data to an external facsimile device.

In the above-described embodiments, the printer 30 having the two control units (31, 32) are described as an example of the image processing device. However, the image processing device may have three or more control units.

In the above-described embodiments, the three performance modes of different performance levels are realized by varying the control capabilities of the control units 31 and 32 and the number of control unit(s) to be in the running state. However, this is not the limitation of the invention. For example, every control unit may have the same control capability. In this case, only the number of control unit(s) to be in the running state is varied for each performance mode.

When a plurality of control units are running simultaneously, these control units cooperate and operate each device to execute functions. For example, the plurality of control units may cooperate and operate a single device (the image processing unit 38, for example). Alternatively, the plurality of control units may operate respective devices (the image forming unit 38 and the printing unit 39) to execute a single function. Still alternatively, a plurality of control units of different performance levels may be prepared, and one of these control units may be in the running state in each of different modes.

In the above-described embodiments, the various tables, such as the mode table, are all stored in the HDD 34. However, the tables may be stored in such memory device external to the printer 30 as the HDD 14 of the terminal device 10. Alternatively, such storing element as NVRAM and flash ROM may be provided to the printer 30 for storing the tables.

In the above-described embodiments, only one of the registration modes is selected for each registered user. However, two or more of the registration modes may be selected for each registered user. In this case, an overall execution load may be determined based on functions specified in these registration modes, and one of the performance modes suited for the overall execution load may be registered.

In the above-described embodiments, the estimated number is input as an expected frequency of use in the expected-use-frequency specify mode. However, the expected frequency of use is not limited to the estimated number of times to execute functions. For example, the expected frequency may be a number of sheets expected to be printed in unit of time, or estimated time intervals at which functions are expected to be executed.

In the above-described embodiments, one of the performance modes is registered in the automatic registration mode based on the history information that identifies the most frequently used mode. However, this is not limitation of the invention. For example, usage of each function may be recorded for each registered user, and a performance mode may be allocated such that a performance mode of higher performance level is allocated to a registered user having history of greater load in executing the functions.

In the above-described embodiments, the running control unit counts the number of times each performance mode is used for each day, and updates the history information stored on the history table based on the counted number. However, this is not limitation of the invention. For example, a user may acquire history information in some method and input this history information to the HDD 34 through manipulation on either the operation unit 35 or the terminal device 10.

In the above-described embodiments, one of the performance modes that has been used the most in the last five days is registered as the most frequently used mode in the history table. However, one of the performance modes that has the highest performance level among one or more performance modes that has been used in the last five days may be registered instead. Alternatively, one of the performance modes of performance level closest to an average performance level of one or more performance modes that has been used in the last five days may be registered.

In the above-described embodiments, it is determined in S7 whether or not the pervious user is the same as the next user, and determined in S9 which one of the registered users matches the current user. However, this is not the limitation of the invention. It may be determined in these steps whether or not the users have a predetermined relationship based on whether the users belong to the same group, for example. It is also conceivable to register a plurality of user groups on the mode table, instead of individual users, and to determine in S9 which one of the registered group the current user belongs.

In the above-described first embodiment, the current mode is maintained if the previous performance mode and the next performance mode are both the high performance mode (S5: Yes, S7: Yes). However, the current mode may also be maintained if the previous user and the next user are the same, even if the previous and next performance modes are either the medium performance mode or the low performance mode. Even this configuration can suppress the load in switching the performance mode. In this case, it is preferable that the any of the performance modes be capable of executing the all functions. For example, it is conceivable to configure such that the second control unit 32 executes the high load function in the low performance mode at decreased processing speed.

In the above-described embodiments, the control units 31 and 32 are only capable of detecting the activation interrupt signals in the sleep state. However, the control units 31 and 32 may be configured so as to be capable of accessing such memory as the HDD 34 even in the sleep state. However, the configuration of the above-described embodiments is advantageous in terms of lower power consumption.

In the above-described embodiments, it is determined in S5 or S21 whether or not the current mode is the high performance mode. However, it may be instead determined whether the current mode is the medium performance mode, because the all functions can be executed in the medium performance mode also. In this case, the current mode is set to the medium performance mode in S23 of FIG. 10. Note that if this alternative configuration has such drawbacks as the processing speed (printing speed) in the medium performance mode is lower than that in the high performance mode, then the configurations of the above-described embodiments are advantageous.

In the above-described embodiment, it is determined in S7 of FIG. 8 whether the previous user matches the next user. However, it may be instead determined in this step whether the performance mode allocated to the next user is also the high performance mode based on the mode table.

What is claimed is:

1. An image processing device comprising:
    an operating unit;
    a plurality of control units configured to control the operating unit to execute a first function on image data, each of the control units including a processing unit;
    a first acquiring unit configured to acquire user-command information indicating a current user; and a memory unit, wherein:
the plurality of control units execute the first function in one of a plurality of modes of different performance levels;
the memory unit is configured to store plural sets of user information and the plurality of modes in correspondence with each other so as to specify correspondence between a plurality of users and the plurality of modes;
the control units execute the first function in one of the plurality of modes corresponding to one of the plurality of users having a predetermined relationship with the current user;
the plurality of modes include at least a first mode of a higher performance level and a second mode of a lower performance level;
the first acquiring unit is configured to acquire another user information for a next user before at least one of the control units determines one of the plurality of modes in which the first function is executed;
the at least one of the control units determines whether the first mode corresponds to the next user based on the correspondence stored in the memory unit; and
the at least one of the control units determines the first mode as the one of the plurality of modes in which the first function is executed regardless of the correspondence stored in the memory unit if the at least one of the control units has determined that the first mode corresponds to the next user.

2. The image processing device according to claim 1, further comprising a second acquiring unit, wherein:
the plurality of control units execute each of a plurality of functions on image data, the plurality of functions including the first function;
the second acquiring unit acquires specified-function information indicating a user and at least one second function selected from among the plurality of functions; and
at least one of the control units stores one of the plurality of modes selected based on a load in executing the at least one second function into the memory unit as a mode corresponding to the user.

3. The image processing device according to claim 1, further comprising a third acquiring unit configured to acquire use-frequency information indicating a user and expected frequency of use of the first function, wherein
at least one of the control units stores one of the plurality of modes selected based on the expected frequency into the memory unit as a mode corresponding to the user.

4. The image processing unit according to claim 1, wherein at least one of the control units determines a history of each of the plurality of users in using the first function, and stores one of the plurality of modes into the memory unit as a mode corresponding to the user based on the history.

5. The image processing unit according to claim 4, wherein the at least one of the control units changes the mode corresponding to the user from one to another of the plurality of modes in accordance with change in the history.

6. The image processing unit according to claim 1, wherein at least one of the control units determines a history of each of the plurality of users in using the modes, and stores one of the plurality of modes into the memory unit as a mode corresponding to the user based on the history.

7. The image processing unit according to claim 6, wherein the at least one of the control units changes the mode corresponding to the user from one to another of the plurality of modes in accordance with change in the history.

8. The image processing unit according to claim 1, further comprising:
a notifying unit; and
a fourth acquiring unit configured to acquire selection information indicating a user and a selected one of the plurality of modes, wherein:
at least one of the control units configured to control the notifying unit to notify the user of evaluation information indicating control capability of each of the plurality of modes before the fourth acquiring unit acquires the selection information, and stores the selected one of the plurality of modes into the memory unit as a mode corresponding to the user.

9. The image processing unit according to claim 1, wherein:
the plurality of control units execute each of a plurality of functions on image data, the plurality of functions including the first function;
the plurality of functions include a heavy load function and a light load function, wherein a load in executing the heavy load function is heavier than a load in executing the light load function; and
if the first function is the light load function, the control units execute the first function in one of the plurality of modes corresponding to a previous user indicated by another user information that the first acquiring unit has acquired last time, regardless of the correspondence stored in the memory unit.

10. The image processing device according to claim 1, wherein:
the first acquiring unit acquires another user-command information for a next user before at least one of the control units determines one of the plurality of modes in which the first function is executed;
at least one of the control units determines whether the next user matches a previous user; and
the at least one of the control units executes the first function in a previous mode selected from among the plurality of modes regardless of the correspondence stored in the memory unit if the next user matches the previous user, wherein a second function has been executed in the previous mode for the previous user.

11. An image processing device comprising:
an operating unit;
a control unit configured to control the operating unit to execute a function on image data in one of a plurality of modes including a first mode and a second mode, the control unit including a first central processing unit and a second central processing unit, wherein both the first and second central processing units are in a running state when the control unit is in the first mode, and only the first central processing unit is in the running state when the control unit is in the second mode;
a first acquiring unit configured to acquire user information indicating a user, and
a memory unit configured to store plural sets of user information and the plurality of modes in correspondence with each other so as to specify correspondence between a plurality of users and the plurality of modes;
when the first acquiring unit acquires the user information, the control unit controls the operating unit to execute the function in one of the plurality of modes stored in the memory unit in correspondence with the user information acquired by the first information, wherein:
the first acquiring unit is configured to acquire another user information for a next user before at least one of the control units determines one of the plurality of modes in which the function is executed;

the at least one of the control units determines whether the first mode corresponds to the next user based on the correspondence stored in the memory unit; and the at least one of the control units determines the first mode as the one of the plurality of modes in which the function is executed regardless of the correspondence stored in the memory unit if the at least one of the control units has determined that the first mode corresponds to the next user.

12. The image processing unit according to claim 11, further comprising a second acquiring unit configured to acquire specifying information indicating the user and a specified function selected from among a plurality of functions, wherein:

the control unit controls the operating unit to execute each of the plurality of functions on image data; and the control unit determines one of the plurality of modes in accordance with a load in executing the specified function and stores the determined one of the plurality of modes into the memory unit in correspondence with the user information.

13. The image processing unit according to claim 11, further comprising a third acquiring unit configured to acquire use-frequency information indicating the user and expected frequency of use of the function, wherein:

the control unit determines one of the plurality of modes in accordance with the expected frequency and stores the determined one of the plurality of modes into the memory unit in accordance with the user information.

14. The image processing device according to claim 11, wherein the control unit stores a history of each of the plurality of users in using the function into the memory unit, and stores one of the plurality of modes selected in accordance with the history of each of the plurality of users into the memory unit in correspondence with each set of user information.

15. The image processing device according to claim 11, wherein the control unit stores a history of each of the plurality of users in using the modes into the memory unit, and stores one of the plurality of modes selected in accordance with the history of each of the plurality of users into the memory unit in correspondence with each set of user information.

16. The image processing device according to claim 11, further comprising:

a notifying unit; and a fourth acquiring unit configured to acquire selecting information indicating the user and a selected one of the plurality of modes, wherein:

the control unit controls the notifying unit to notify the user of evaluation information indicating control capability of each of the plurality of modes before the fourth acquiring unit acquires the selecting information, and stores the selected one of the plurality of modes into the memory unit in correspondence with the user information.

17. The image processing device according to claim 11, wherein:

the control unit is configured to execute a first function only in the first mode, a second function either in the first mode or in the second mode, and a third function only in the first mode; and when the control unit executes the first function, the second function, and the third function in this order, the control unit executes the second function in the first mode.

18. A storage medium storing a set of program instructions executable on an image processing device including an operating unit, a plurality of control units configured to control the operating unit to execute a function on image data and that include respective processing units, an acquiring unit, and a memory unit, and usable for controlling at least one of the plurality of control units, the instructions comprising:

controlling the at least one of the plurality of control units to control the acquiring unit to acquire user-command information indicating a current user;

controlling the at least one of the plurality of control units to read registered information from the memory unit, the registered information indicating correspondence between a plurality of users and a plurality of modes of different performance levels, the plurality of modes including at least a first mode of a higher performance level and a second mode of a lower performance level;

controlling the at least one of the plurality of control units to determine one of the plurality of modes corresponding to one of the plurality of users having a predetermined relationship with the current user based on the registered information and to control the operating unit to execute the function in the predetermined one of the plurality of modes;

controlling the at least one of the plurality of control units to control the acquiring unit to acquire another user-command information for a next user before at least one of the control units determines one of the plurality of modes in which the function is executed;

controlling the at least one of the control units to determine whether the first mode corresponds to the next user based on the correspondence stored in the memory unit; and controlling the at least one of the control units to determine the first mode as the one of the plurality of modes in which the function is executed regardless of the correspondence stored in the memory unit if the at least one of the control units has determined that the first mode corresponds to the next user.

19. An image processing system comprising:

an image processing device that executes a function on image data; and an information processing device communicable with the image processing device, wherein:

the image processing device includes:

an operating unit;

a plurality of control units configured to control the operating unit to execute the function, each of the control units including a processing unit; and an acquiring unit configured to acquire user information indicating a current user;

the information processing device includes a memory unit;

the plurality of control units execute the function in one of a plurality of modes of different performance levels;

the memory unit is configured to store plural sets of user information and the plurality of modes in correspondence with each other so as to specify correspondence between a plurality of users and the plurality of modes;

the control units execute the function in one of the plurality of modes corresponding to one of the plurality of users having a predetermined relationship with the current user;

the plurality of modes include at least a first mode of a higher performance level and a second mode of a lower performance level;

the first acquiring unit acquires another user-command information for a next user before at least one of the control units determines one of the plurality of modes in which the function is executed;

the at least one of the control units determines whether the first mode corresponds to the next user based on the correspondence stored in the memory unit; and the at least one of the control units determines the first mode as the one of the plurality of modes in which the function is executed regardless of the correspondence stored in the memory unit if the at least one of the control units has determined that the first mode corresponds to the next user.

\* \* \* \* \*